United States Patent [19]
Timmons

[11] Patent Number: 5,255,860
[45] Date of Patent: Oct. 26, 1993

[54] TIRE COMMUNICATIONS DEVICE

[75] Inventor: Charles T. Timmons, Bronte, Tex.

[73] Assignee: Charles T. Timmons, Baytown, Tex.

[21] Appl. No.: 930,741

[22] Filed: Aug. 14, 1992

[51] Int. Cl.$^5$ .............................................. B02C 1/08
[52] U.S. Cl. ................................... 241/280; 241/294;
  241/DIG. 31
[58] Field of Search ............... 241/280, 282, 294, 295,
  241/DIG. 31, DIG. 38

[56] References Cited

U.S. PATENT DOCUMENTS

| | | |
|---|---|---|
| 1,087,967 | 12/1914 | Moussette . |
| 1,298,743 | 4/1919 | Lichtenberg . |
| 1,766,582 | 6/1930 | Ball . |
| 1,911,514 | 5/1933 | Kernan . |
| 2,135,440 | 11/1938 | Longenecker et al. . |
| 2,702,217 | 2/1955 | Treshow . |
| 3,582,279 | 6/1971 | Beckman et al. . |
| 3,772,242 | 11/1973 | Liska et al. . |
| 3,809,680 | 5/1974 | Wakefield . |
| 3,823,221 | 7/1974 | Wakefield et al. . |
| 3,823,224 | 7/1974 | Laman et al. . |
| 3,880,807 | 4/1975 | Wakefield et al. . |
| 3,890,141 | 6/1975 | Crane et al. . |
| 3,896,059 | 7/1975 | Wakefield et al. . |
| 3,907,583 | 9/1975 | Crane . |
| 3,946,680 | 3/1976 | Laman . |
| 3,966,487 | 6/1976 | Crane et al. . |
| 3,992,899 | 11/1976 | Spahn . |
| 3,995,816 | 12/1976 | Motek ......................... 241/DIG. 31 |
| 4,052,344 | 10/1977 | Crane . |
| 4,074,594 | 2/1978 | Dall et al. ........................... 241/294 |
| 4,093,129 | 6/1978 | Polansky . |
| 4,200,400 | 4/1980 | Laubach et al. . |
| 4,221,608 | 9/1980 | Beckman . |
| 4,240,587 | 12/1980 | Letsch . |
| 4,273,000 | 6/1981 | Schmid . |
| 4,635,862 | 1/1987 | West et al. . |
| 4,684,070 | 8/1987 | Dicky . |
| 4,714,201 | 12/1987 | Rouse et al. . |
| 4,726,530 | 2/1988 | Miller et al. . |
| 4,776,249 | 10/1988 | Barclay . |
| 4,813,614 | 3/1989 | Moore et al. . |
| 4,854,508 | 8/1989 | Dicky . |
| 4,863,106 | 9/1989 | Perkel . |
| 4,927,088 | 5/1990 | Brewer . |
| 5,048,764 | 9/1991 | Flament . |

Primary Examiner—Douglas D. Watts
Attorney, Agent, or Firm—Baker & Botts

[57] ABSTRACT

A device for grinding tires and the scraps.

19 Claims, 4 Drawing Sheets

TIRE COMMUNICATIONS DEVICE

BACKGROUND OF THE INVENTION

When the automobile was first invented, no one gave much thought to the trash it would produce. At that time, when the tires wore out, they were thrown out. Most ended up in land fills or were burned, but neither disposal method has been acceptable. Over time, tires tend to "float" to the surface of a landfill. Also, burning is popular with no one, due to the pollution and smell. Some tires are retreaded and reused, but the majority must still be disposed in some fashion.

The number of discarded tires is increasing, and the problems with traditional disposal methods are becoming more acute. For example, many landfills now either refuse to take tires or are prevented from doing so by legislation. The burning of tires in the outside air is both a pollutant and a nuisance to those nearby and has also been made illegal in many locations. Therefore, there is a need for a method and device for disposing of tires without burning or disposing in a landfill.

Luckily, there is also a market for granularized rubber of the type used in tires. For example, granularized rubber can be used as a filler in construction work, or as a fuel in some plants. Therefore, if the tires can be reduced to a granularized form, much of the old tire disposal problem can be alleviated.

The disposal need has been recognized for many years, and many have tried to invent processes and devices for disposing of old tires. Those efforts can be grouped into three basic groupings: shredders, temperature treatments, and chemical treatments. Examples are seen in the following U.S. Pat. Nos., all of which are incorporated herein by reference: 5,048,764 Flament; 4,927,088 Brewer; 4,854,508 Dicky; 4,776,249 Barclay; 4,684,070 Dicky; 4,635,862 West, et al.; 4,093,129 Polansky; 4,726,530 Miller, et al.; 4,714,201 Rouse, et al.; 4,863,106 Perkel; 4,813,614 Moore, et al.; 4,240,587 Letsch; 3,992,899 Spahn; 4,273,000 Schmid; 4,200,400 Laubach, et al.; 2,702,217 Treshow; 2,135,440 Longenecker, et al.; 1,911,514 Kernan; 1,766,582 Ball; 1,298,743 Lichtenberg; 1,087,967 Moussette; 4,052,344 Crane, et al; 3,880,807 Wakefield, et al; 3,809,680 Wakefield; 3,896,059 Wakefield, et al; 3,946,680 Laman; 3,890,141 Crane, et al; 3,582,279 Beckman, et al; 3,772,242 Liska, et al; 4,221,608 Beckman; 3,966,487 Crane, et al; 3,823,224 Laman, et al; 3,907,583 Crane; and 3,823,221 Wakefield, et al.

One major problem with shredding, at least as practiced to date, is that the belts of steel belted tires wrap around the shredding blades and other apparatus, thereby tearing up the shredder. Chemical processes have waste problems of their own, and they are not useful to reduce the tire to a granular form for use in construction. Freezing and breaking the tire avoids the chemical effluent problem, and avoids having a shredder destroyed by the steel belts, but the process requires a large amount of energy and requires further processing to remove the belts. Then, the broken tire bits must be further reduced to a size useful in other markets, such as construction.

Recently, it was suggested that a way to avoid the above problems was to grind the tires, rather than shred them. The theory was that if all of the tire, including the steel belts, could be ground to a granular size, then there would not be a problem with the steel belts wrapping around rotating blades and bearings, thereby tearing up the shredder, itself. To try this concept, a series of sharp grinding bits were applied to steel plates, and the plates were bolted to the outer surface of a rotatable drum. A straight plate was then mounted tangentially to the drum's surface to act as a funnel, and tire scraps were dropped between the drum and the straight plate. The bits were knocked from the plates and the tire scraps were not ground. The experiment Was a failure.

Therefore, at the time of the present invention, there was a need for a device and method of commutating tires (herein, "tires" includes whole tires and tire scraps), some of which include steel belts, that would not require a freezing and breaking step. There was also a need for a method and device which would not have to use shredding blades that allowed the steel to wrap up in the rotating apparatus.

SUMMARY OF THE INVENTION

According to the present invention, it was found that, contrary to the prior art experience, grinding tires with a drum could work. It was discovered that the drum concept had previously failed because of vibrations between the plate on which the bits were mounted and the drum to which the plates were bolted. It was also discovered that if a curved wedge is used to force the tires against the spinning drum, a twisting and tearing of the tire occurs, separate and apart from the grinding action that took place at the location of least clearance between the drum and the wedge.

Therefore, according to one embodiment of the present invention, there is provided an apparatus for commutating tires comprising a rotatable drum having an outer surface which is coated with a bonding agent. Bits are attached directly to the drum surface with the bonding agent, thereby providing a rough outer surface to the drum itself, and eliminating the vibration problems which the prior art did not recognize was causing tire grinders to fail.

According to one embodiment, the bonding agent comprises a metal (for example, an alloy of about 60 percent Nickel to 40 percent Silver). Also according to one embodiment, the bits comprise a cutting material (for example, an alloy of tungsten and carbide) suspended by a solidified mass of the bonding agent. According to this embodiment, the bits are elongated and mounted substantially in parallel to the axis of the drum.

Also provided according to an embodiment of the invention is a means for forcing the tires against the bits, comprising a wedge having a curved surface shape on one side of the wedge and a first edge located a first distance from the outer surface of the drum. The first edge is in close proximity to the outer surface of the drum, being placed as close as possible without touching the bits as the drum rotates, thus providing as small a space as possible between the first edge and the bits. It is this space through which the ground pieces of the tires pass. The wedge further comprises a second edge located at a second distance from the outer surface of the drum, the second distance being sufficient to allow the tires to pass between the second edge and the outer surface of said drum, so that the grinding, twisting, and tearing of the tires increases as the tire pieces are forced through the space between the wedge and the bits from the second to the first edge.

According to one embodiment, there is also provided a means for adjustably selecting the first and second distances, comprising a pivot, which is connected to the wedge at a pivot location between the first and second edges. There is also provided a means for adjusting the position of the wedge about the pivot, wherein the means for adjusting comprises a turn buckle attached between the wedge and a fixed plate.

DESCRIPTION OF EMBODIMENTS OF THE INVENTION

Figure 1:
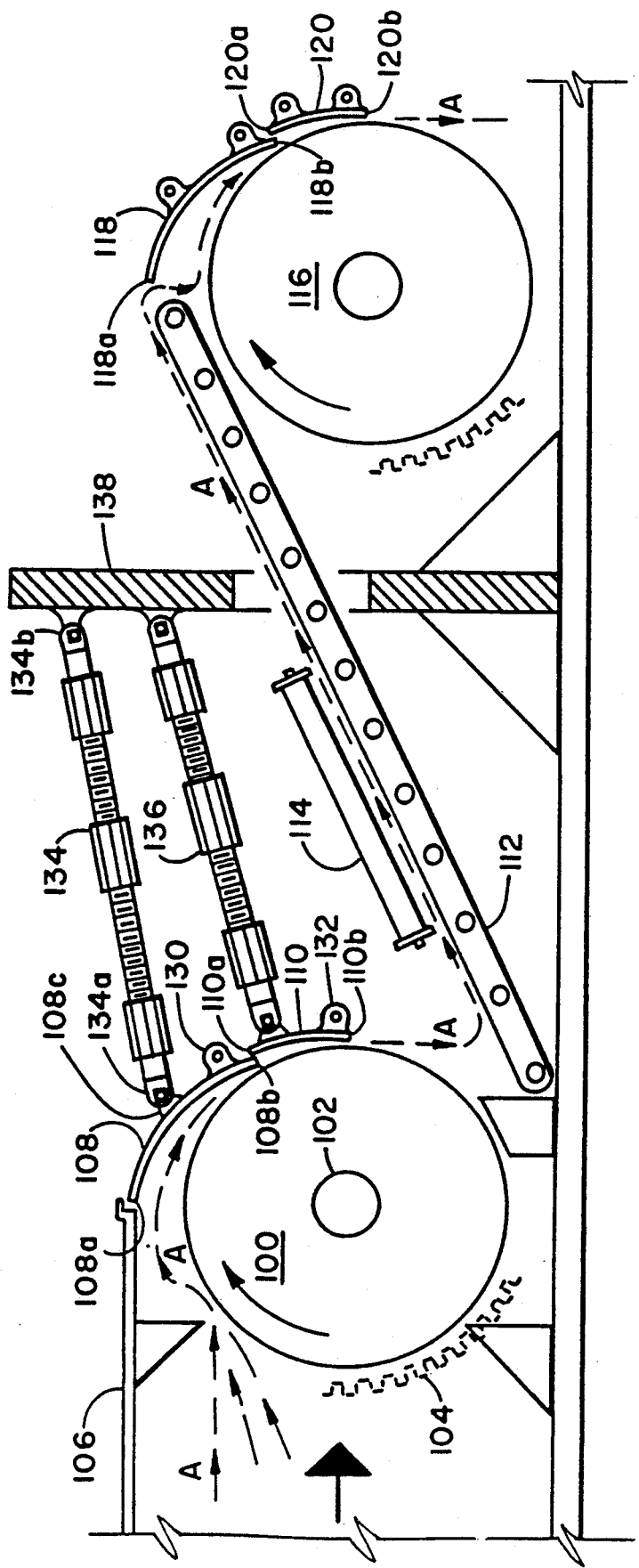
FIG. 1 is a side view of one embodiment of this invention.

Referring now to FIG. 1, the mechanical interconnections of the invention can be seen where a drum 100 is mounted to an axle 102, which is turned by gear 104. Tires are pushed by a hydraulic ram (not shown), in the direction of arrows A, until the tires come in contact with the drum 100 and are pressed between drum 100 and housing 106.

The rotating action of drum 100 and the pressing action of the hydraulic ram cause the tires to be pinched and twisted between housing 106 and drum 100. This twisting and pinching action causes the tires to begin to break apart. Further, drum 100 has mounted on its outer surface grinding bits (to be more fully described below) which grind the tires in contact with the surface of drum 100.

As the tires are reduced to smaller and smaller sizes, they enter a space between drum 100 and wedge 108, where the grinding continues to reduce the size of the tires until they are so small that they can pass between edge 108b and the surface of drum 100. At that point, they enter a space between wedge 110 and drum 100 where they are held for a secondary grinding period, to further reduce the size of what has become crumb rubber. The crumb rubber eventually is reduced to a fine enough size to pass between drum 100 and edge 110b, from where it drops onto conveyor 112.

The resultant material may contain scraps of steel that originally made up steel belts in the tires, and a separation process is carried out by magnetic conveyor 114 which is positioned over conveyor 112 to pick up metal from the tire scraps. The exact location of magnetic conveyor 114 is not critical for this embodiment. For example, according to alternative embodiments, magnetic conveyor 114 is placed above a conveyor after the last drum 116.

Conveyor 112 transports the tire material to another drum 116, mounted as is drum 100, for further grinding between wedges 118 and 120, again reducing the size of the tire material so that the tire material can pass between the surface of 116 and edges 118b and 120b. After exiting from edge 120b, the tire material is collected and used for other purposes. Although FIG. 1 shows two drums 100 and 116, the wedge mountings for only drum 100 are shown. The wedges 118 and 120 of drum 116 are mounted a are the wedges 108 and 110, as will be understood by those of ordinary skill in the art, or by other means that will occur to those of ordinary skill in the art.

Referring still to FIG. 1, wedge 108 is mounted a variable distance from the surface of drum 100 at pivot location 130, and wedge 110 is mounted a variable distance from the surface of drum 100 at pivot location 132. The distance between edge 108a and the surface of drum 100, as well as the distance between edge 108b and the surface of drum 100, is adjusted by pivoting edge 108 about pivot 130 by means of turn buckle 134.

Turn buckle end 134a is connected to wedge 108 at turn buckle mount location 108c. Turn buckle end 134b is connected to fixed mount 138, which is positioned a fixed distance from the surface of drum 100. By adjusting the length of turn buckle 134, as is known to those of skill in the art, wedge 108 pivots about pivot location 130, thereby adjusting the distance between edge 108a and the surface of drum 100, as well as the distance between edge 108b and the surface of drum 100.

Turn buckle 136 is connected to wedge 110 and fixed mount 138 in the same manner as turn buckle 134 is connected to edge 108 and fixed mount 138. Therefore, adjustment of the length of turn buckle 136 causes wedge 110 to pivot about pivot location 132, thereby adjusting the distance between edge 110a and surface of drum 100, as well as the distance between edge 110b and the surface of drum 100.

Figure 2:
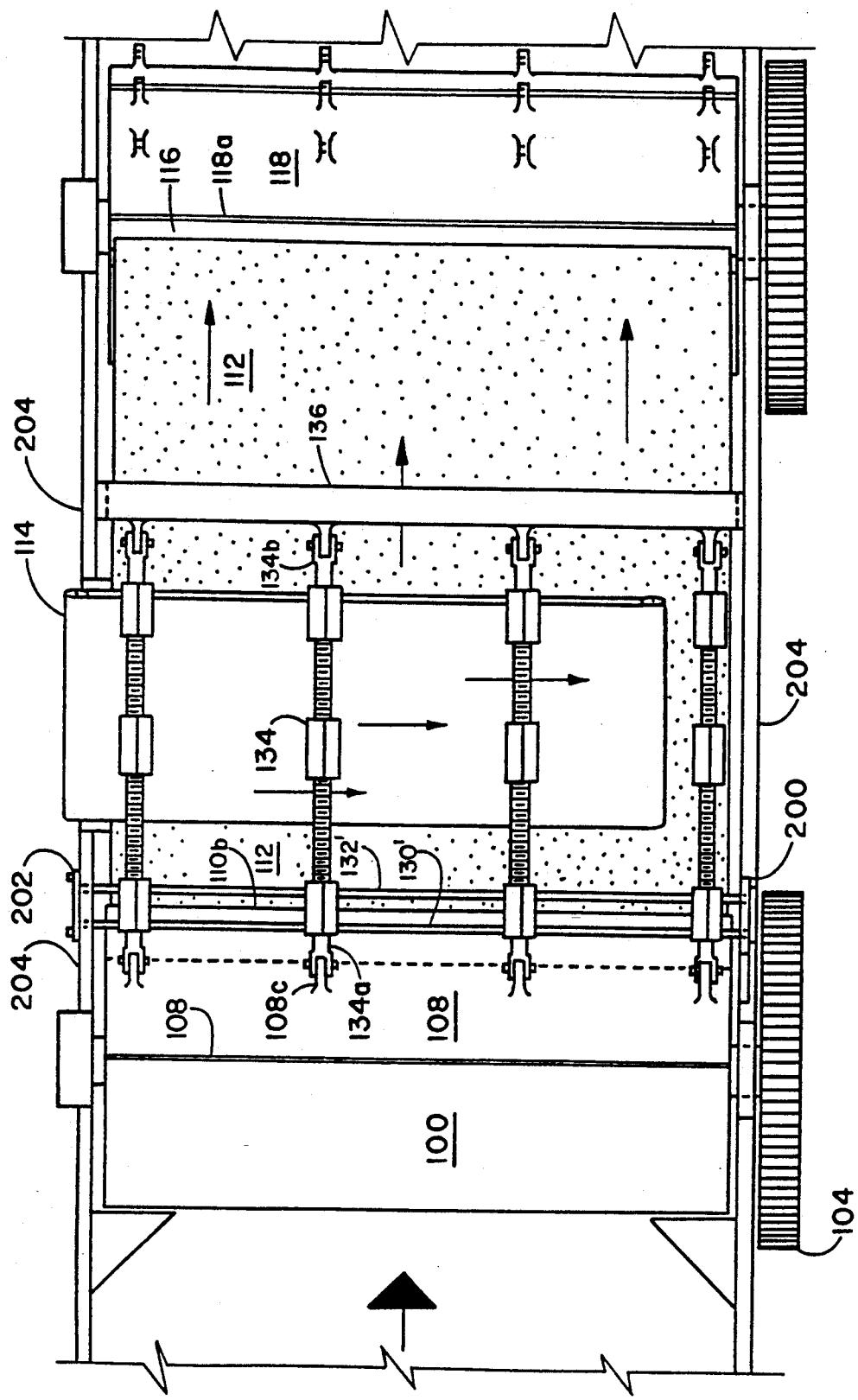
FIG. 2 is a top view of the same embodiment shown in FIG. 1.

Referring now to FIG. 2, a top view of the system shown in FIG. 1 is seen in which housing 106 has been removed. Numbers corresponding to the structure shown in FIG. 1 are the same as in FIG. 1. Because FIG. 2 is a top view, turn buckle 136 is hidden beneath turn buckle 134.

Referring specifically to the method of mounting wedges 108 and 110 at pivot locations 130 and 132, pivot rods 130' and 132' pass through pivot locations 130 and 132 of FIG. 1. Pivot rods 130' and 132' are connected on either side of drum 100 to pivot rod mounts 200 and 202. According to the embodiment of FIG. 2, pivot mount 200 comprises a plate connected to a frame 204 by any means that will occur to those of skill in the art (for example, threaded, drilled through and bolted, or welded). Pivot rods 130' and 132' are also connected to pivot rod mount 200 by any means that will occur to those of skill in the art (for example, threaded, drilled through and bolted, or welded). Pivot mount 202, according to the embodiment of FIG. 2, comprises a plate connected to the outside of frame 204 by any means that will occur to those of skill in the art (for example, bolting or welding), and pivot rods 130' and 132' are connected to pivot mount 202 by any means that will occur to those of skill in the art (for example, threaded, drilled through and bolted, or welded).

Referring still to FIG. 2, it will be seen that providing an integral frame 204 allows for rigidity and strength of different mounting members. For example, by providing the same unitary frame 204 for mounting fixed mount 138 a fixed distance from drum 100, and mounting axle 102 of drum 100 to frame 204, strength and reliability of the system is enhanced.

Figure 3:
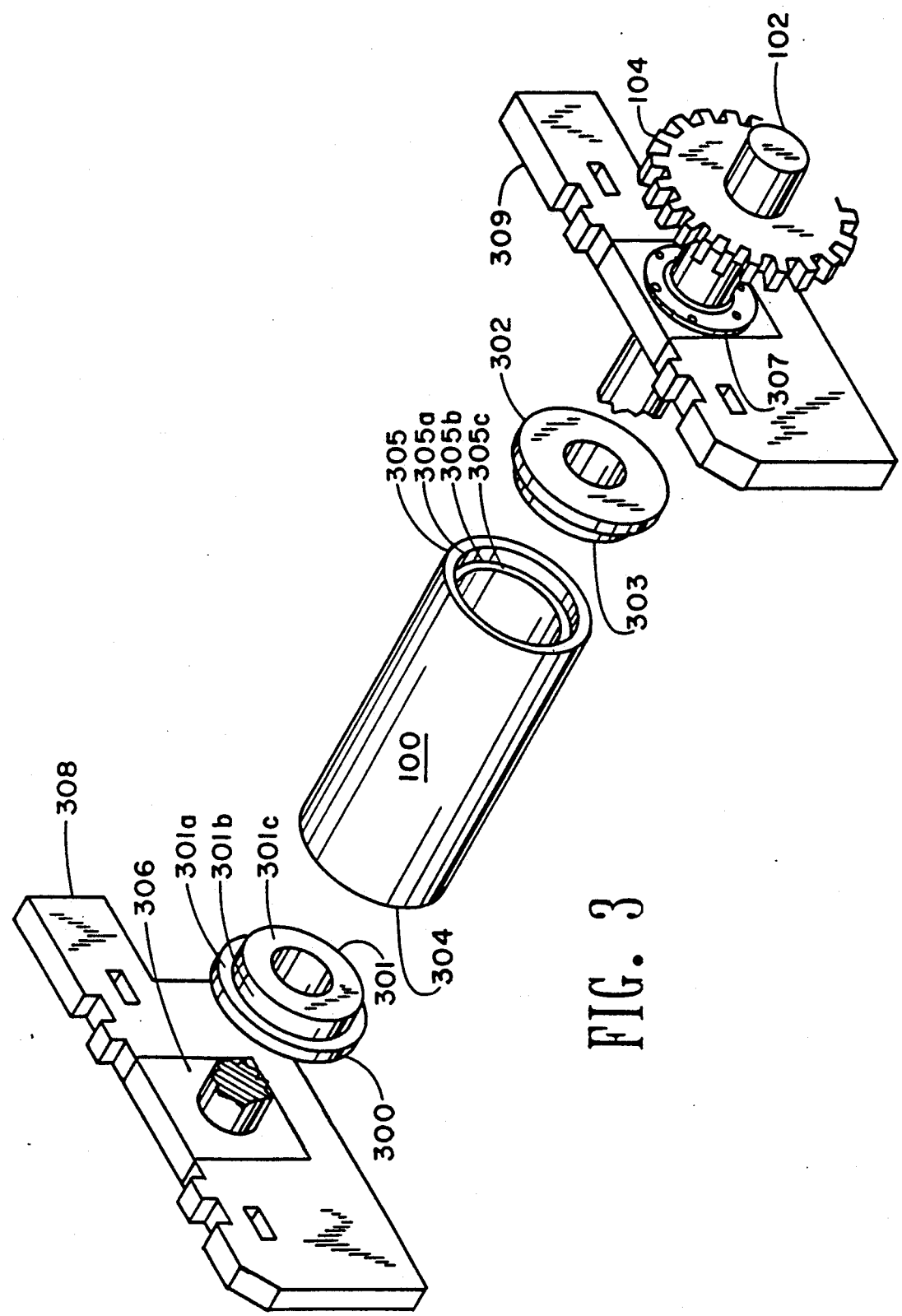
FIG. 3 is an exploded assembly drawing of an embodiment of the invention and its mechanical interaction.

Referring now to FIG. 3, an embodiment of drum 100 will be described, in which drum 100 comprises a steel cylinder of variable inches in diameter. Steel hubs 300 and 302 (for example, railroad wheels machined to include flange surfaces as described below) are pressed onto drum 100, as will be understood those of skill in the art. Axle 102 (FIG. 1) is connected to hubs 300 and 302, and is mounted on inverted railroad truck mounts 308 and 309 by bearing assemblies 306 and 307 as is known to those of skill in the art. Inverted railroad truck mounts 308 and 309 are directly mounted to frame 204 (FIG. 2), by any means that will occur to those of skill in the art (for example, welding or bolting).

Referring still to FIG. 3, it will be seen that drum 100 contains a flange 304 at one end and a flange 305 at the other end, each flange being substantially identical to the other. Additionally, steel hubs 300 and 302 are substantially identical and contain flanges 301 and 303 respectively. Hub flange 301 is dimensioned to mate within a drum flange 304, and hub flange 303 is dimensioned to mate within drum flange 305. More specifically, hub flange 301 contains flange surfaces 301a, 301b and 301c. Also, flange drum 305 has flange surfaces 305a, 305b and 305c. When the hubs 300 and 302 are pressed against the drum 100, the flange surfaces of the hubs contact the flange surfaces of drum 100, as will be understood by those of skill in the art. Thus, there is provided an interactive fit which increases the strength of the drum assembly.

Drum 100 turns simultaneously with hubs 300 and 302, which, in turn, are connected to axle 102 as is known to those of skill in the art. In addition to the friction fit achieved by pressing hubs 300 and 302 onto drum 100, additional means for attaching many be employed as will occur to those of skill in the art (for example, welding, bolting, dowel pins, etc.).

Still referring to FIG. 3, gear 104 is pressed on axle 102 outside of railroad truck mount 3-9 in a manner known to those skilled in the art. The size of gear 104 to be used is a function of the desired torque power versus the desired speed and can be determined readily by any practitioner of the art. For this embodiment, gear 104 comprises a gear size of 28½ inches (gear 104 turns 15 revolutions for every 62 revolutions of a drive means (not show)). For example, gear 104 is turned at a speed of 25 to 300 r.p.m. by a 250 h.p. DC electric motor. 150 r.p.m. has been found to be acceptable.

Figure 5:
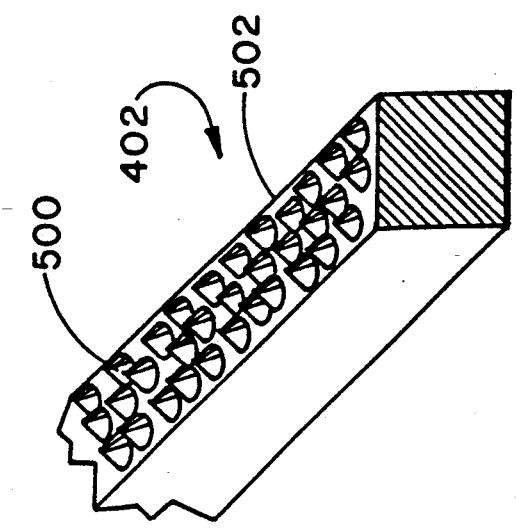
FIG. 5 is a close up cutaway end view of an embodiment of a bit member 402.
Figure 4:
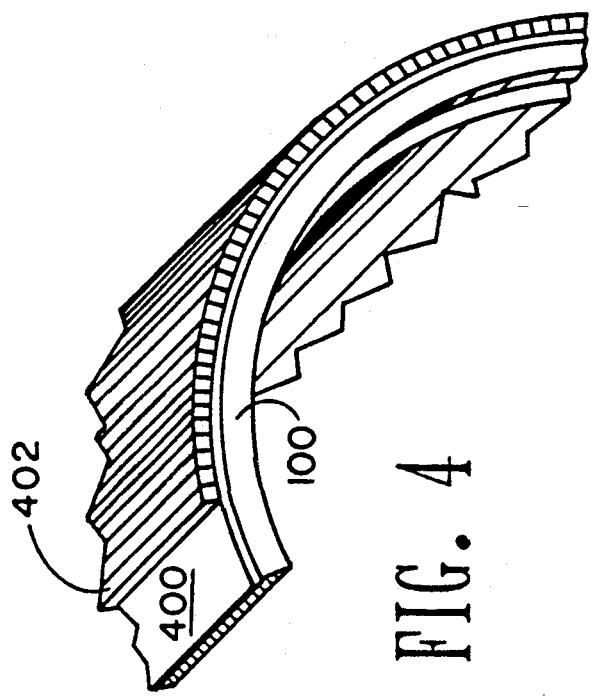
FIG. 4 is a cutaway end view of an unmounted drum surface of an embodiment of the invention.

Referring now to FIGS. 4 and 5, and embodiment of drum 100 is shown in which the different layers of the grinding surface are seen. Referring specifically to FIG. 4, drum 100 is shown in cross-section, coated with a bonding agent 400 (for example, a nickel and copper alloy commonly used for attaching oil field bits). Bonding agent 400 is attached, according to one embodiment, by heating drum 100 and a "tinning-rod" rod of bonding agent 400 to allow bonding agent 400 to spread along the surface of drum 100. Layered on and within bonding agent 400 are bit members 402.

Referring now to FIG. 5, an example of one of bit members 402 is shown in representational form comprising grinding chunks 500, made from bit metal (for example, tungston/carbide chunks, commonly used in oil field drilling bits), suspended in a metal alloy 502, which is similar in composition to bonding agent 400.

Referring again to FIG. 4, bit members 402 are attached to bonding agent 400 by heating bit members 402 and bonding agent 400 to cause melting of bonding agent 400 and metal alloy 502, thereby causing bonding agent 400 and metal alloy 502 to intermix. Upon cooling, the solidifying mass of metal alloy 502 and bonding agent 400 suspends grinding chunks 500 on the surface of drum 100 without any discrete attachment points (for example, bolts or welds), thereby avoiding vibration problems and shearing forces seen in prior art practices.

The above embodiments are provided by way of example, and not by way of limitation. Other embodiments will occur to those of skill in the art without departing from the spirit of the present invention as set forth in the claims below.

What is claimed is:

1. An apparatus for comminution of tires comprising:
   a rotatable drum, said rotatable drum having an outer surface;
   a bonding metal coated to said outer surface;
   a plurality of bits attached to said bonding metal, wherein said bits comprise a first bit component and a second bit component, said first bit component comprising a cutting tool alloy; and said second bit component comprising metal similar in composition to said bonding metal
   a means for forcing the tires against said bits.

2. An apparatus as in claim 1 wherein said bonding metal comprises Nickel.

3. An apparatus as in claim 1 wherein said bonding metal comprises Silver.

4. An apparatus as in claim 1 wherein said bonding metal comprises more Nickel than Silver.

5. An apparatus as in claim 1 wherein said bonding metal comprises about 6 parts of Nickel to about 4 parts of Silver.

6. An apparatus as in claim 1, wherein said first bit component is harder than said second bit component, said first bit component being suspended by a solidified mass of said second bit component.

7. An apparatus as in claim 1 wherein said second bit component comprises a bit metal.

8. An apparatus as in claim 7 wherein said bit metal comprises Nickel.

9. An apparatus as in claim 7 wherein said bit metal comprises Silver.

10. An apparatus as in claim 7 wherein said bit metal comprises more Nickel than Silver.

11. An apparatus as in claim 7, wherein said bit metal comprises about 6 parts of Nickel to about 4 parts of Silver.

12. An apparatus as in claim 1, wherein said means for forcing comprises a wedge having:
    a first edge located at a first distance from said outer surface of said drum, said first distance being sufficient to allow the tires to pass between said first edge and said outer surface of said drum;
    a curved surface shape on one side of said wedge; and
    a second edge located a second distance from said outer surface of said drum, said first distance being greater than said second distance, said second edge being in close proximity to said outer surface of said drum, whereby the tires are reduced to chunks.

13. An apparatus as in claim 12 further comprising a means for adjustability selecting said first distance and said second distance.

14. An apparatus as in claim 13 wherein said means for selecting comprises a pivot connected to said wedge at a pivot location between said first and said second edges.

15. An apparatus as in claim 14 further comprising a means for adjusting the position of said wedge about said pivot.

16. An apparatus as in claim 15 wherein said means for adjusting comprises a turn buckle having two ends, said turn buckle being attached at one end to said wedge between said first edge and said pivot location, and being attached at another end to a turn buckle mount, said turn buckle mount being located a fixed distance from said outer surface.

17. An apparatus as in claim 16, further comprising a second wedge positioned and arranged to force the chunks against said outer surface after the chunks exit from between said outer surface and said first edge.

18. An apparatus as in claim 17, wherein said bits comprise two components, a first bit component being harder than a second bit component, said first bit component being suspended by a solidified mass of said second bit component, wherein said second bit component comprises about 6 parts of Nickel to about 4 parts of Silver.

19. An apparatus as in claim 18, wherein said bonding agent comprises about 6 parts of Nickel to about 4 parts of Silver.

* * * * *

UNITED STATES PATENT AND TRADEMARK OFFICE
CERTIFICATE OF CORRECTION

PATENT NO. : 5,255,860
DATED : October 26, 1993
INVENTOR(S) : Charles T. Timmons It is certified that error appears in the above-identified patent and that said Letters Patent is hereby corrected as shown below:

Title page, item [54]
IN THE TITLE, and col. 1, line 1,

Delete "Communications" and insert --Comminution-- therefor.

Col. 1, line 1, after "Tire", delete "Communications" and insert --Comminution-- therefor.

Col. 2, line 8, after "experiment", delete "Was" and insert --was-- therefor.

Col. 2, line 10, after "of", delete "commutating" and insert --comminuting-- therefor.

Col. 2, line 33, after "for", delete "commutating" and insert --comminuting-- therefor.

UNITED STATES PATENT AND TRADEMARK OFFICE
CERTIFICATE OF CORRECTION

PATENT NO. : 5,255,860
DATED : October 26, 1993
INVENTOR(S) : Charles T. Timmons It is certified that error appears in the above-identified patent and that said Letters Patent is hereby corrected as shown below:

Col. 3, line 68, after "mounted", delete "a" and insert --as-- therefor.

Col. 4, line 67, after "understood", insert --by-- therefor.

Col. 5, line 27, after "attaching", delete "many" and insert --may-- therefor.

Col. 5, line 38, after "not", delete "show" and insert --shown-- therefor.

Col. 5, line 41, after "5", delete "and" and insert --an-- therefor.

Col. 5, line 55, after "example", delete "tungston" and insert --tungsten--therefor.

Signed and Sealed this

Ninth Day of August, 1994

*Attest:*

BRUCE LEHMAN

*Attesting Officer*  *Commissioner of Patents and Trademarks*